United States Patent [19]

Nelson

[11] Patent Number: 4,798,403
[45] Date of Patent: Jan. 17, 1989

[54] PERSONAL IDENTIFICATION METHOD

[76] Inventor: Frederic P. Nelson, 17 S. First St., Apartment 1402A, Minneapolis, Minn. 55401

[21] Appl. No.: 100,605

[22] Filed: Sep. 24, 1987

Related U.S. Application Data

[63] Continuation of Ser. No. 705,205, Feb. 25, 1985, abandoned.

[51] Int. Cl.⁴ .................. G06K 3/00; G06K 5/00; B42D 15/00
[52] U.S. Cl. .................................. 283/70; 283/74; 235/380
[58] Field of Search .................. 283/7, 8, 17, 58, 69, 283/70, 74; 40/2 A, 2.2; 235/380

[56] References Cited

U.S. PATENT DOCUMENTS

| | | | |
|---|---|---|---|
| Re. 30,579 | 4/1981 | Goldman et al. | 340/149 |
| 47,798 | 5/1865 | Chittenden . | |
| 478,294 | 7/1892 | Spivey . | |
| 777,149 | 12/1904 | Scudder . | |
| 1,072,341 | 9/1913 | Lincoln . | |
| 1,136,876 | 4/1915 | Hebern . | |
| 1,556,895 | 10/1925 | Ayers . | |
| 1,813,257 | 7/1931 | Rand, Jr. . | |
| 2,974,426 | 3/1961 | McDonald | 283/70 |
| 3,048,697 | 8/1962 | Cavanaugh et al. | 250/71 |
| 3,350,800 | 11/1967 | Witt et al. | 283/70 |
| 3,363,346 | 1/1968 | Wittboldt | 40/2.2 |
| 3,556,563 | 1/1971 | Scheinberg et al. | 283/7 |
| 3,571,957 | 3/1971 | Cumming | 283/70 |
| 4,180,284 | 12/1979 | Ashley | 283/20 |
| 4,325,570 | 4/1982 | Estrada | 283/7 |
| 4,336,754 | 6/1982 | Loeb | 101/127 |
| 4,443,027 | 4/1984 | McNeely et al. | 283/83 |
| 4,449,040 | 5/1984 | Matsuoka et al. | 235/380 |
| 4,469,937 | 9/1984 | Stockburger et al. | 283/70 |
| 4,629,215 | 12/1986 | Maurer et al. | 283/70 |

FOREIGN PATENT DOCUMENTS

| | | |
|---|---|---|
| 449334 | 6/1948 | Canada . |
| 1458965 | 11/1966 | France . |
| 2077659 | 12/1981 | United Kingdom . |

*Primary Examiner*—Frank T. Yost
*Assistant Examiner*—Paul M. Heyrana, Sr.
*Attorney, Agent, or Firm*—Kinney & Lange

[57] ABSTRACT

A method of identification to determine whether a person tendering a document, such as a check or credit card, is the proper bearer of the instrument. The method involves assigning a series of letters designating various physical characteristics of the proper bearer of the instrument, such as the sex and race of the person, the color of the eyes and hair, the age, height and weight, and whether the person typically carries any of several different accessories. Letters corresponding to these various characteristics are applied to the instrument so that the person to whom it is tendered need merely compare the characteristics identified by the letters with the characteristics of the person tendering the instrument. In one modification, numerals are used to indicate age, height and weight. Where the information is added to a credit card in which the information with regard to the account number, name and so forth is embossed upwardly, the information can be applied so that it does not project above the surface of the card so that it does not appear upon carbons or charge slips when the card is placed into an ordinary credit card charge slip imprinting machine. The information with regard to the physical characteristics of a person may be imprinted on a check following the name. The information with regard to the payee can also be added to checks by providing a series of columns with identifying data and marking the data peculiar to the particular payee.

2 Claims, 3 Drawing Sheets

| FEATURE | KEY LETTER | DESIGNATION | | DESCRIPTION | | | | |
|---|---|---|---|---|---|---|---|---|
| SEX | FIRST | F M | | FEMALE | MALE | | | |
| RACE | FIRST | B C H I O | | BLACK | CAUCASIAN | HISPANIC | INDIAN | ORIENTAL |
| EYES | LAST | E K L N | | BLUE | BLACK | HAZEL | BROWN | |
| HAIR | LAST | D E K N Y | | BLOND | WHITE | BLACK | BROWN | GRAY |
| AGE | FIRST | Y M S | | YOUNG | MATURE | SENIOR | | |
| HEIGHT | FIRST | S M T | | SHORT | MEDIUM | TALL | | |
| WEIGHT | FIRST | L M H | | LIGHT | MODERATE | HEAVY | | |
| ACCESSORY | FIRST | G H W U | | GLASSES | HEARING | WALKING | UNAPPLICABLE | |

| FEATURE | KEY LETTER | DESIGNATION | DESCRIPTION | | | | |
|---|---|---|---|---|---|---|---|
| SEX | FIRST | F M | FEMALE | MALE | | | |
| RACE | FIRST | B C H I O | BLACK | CAUCASIAN | HISPANIC | INDIAN | ORIENTAL |
| EYES | LAST | E K L N | BLUE | BLACK | HAZEL | BROWN | |
| HAIR | LAST | D E K N Y | BLOND | WHITE | BLACK | BROWN | GRAY |
| AGE | ACTUAL | | 25, 33, 40, 58, 65, 73, ETC. | | | | |
| HEIGHT | IN INCHES | | 5'4" = 64, 6'2" = 74, 6'4" = 76, ETC. | | | | |
| WEIGHT | FIRST TWO FIGURES | | 132 LBS. = 13, 170 LBS. = 17, ETC. | | | | |
| ACCESSORY | FIRST | G H W U | GLASSES | HEARING | WALKING | UNAPPLICABLE | |

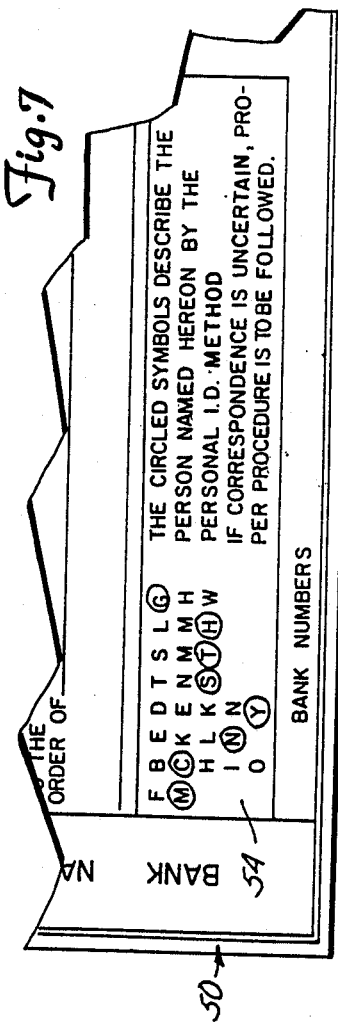
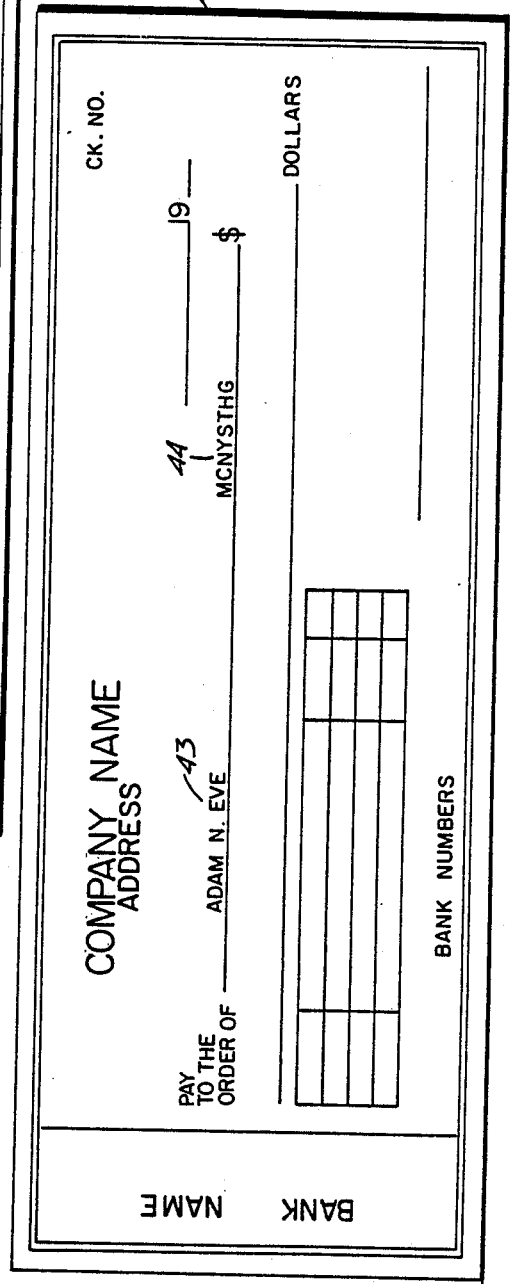
Fig. 5
Fig. 6
Fig. 7

PERSONAL IDENTIFICATION METHOD

This is a continuation of application Ser. No. 06/705,205, filed Feb. 25, 1985.

BACKGROUND OF THE INVENTION

1. Field of the Invention

The field of the invention is a method of identifying an individual by that person's physical features through the use of a system employing identification indicia which directly relate to those features by name or to terminology readily descriptive of those characteristics.

2. Description of Prior Art

The problem of the fraudulent use of credit cards, checks or similar items has become increasingly serious in recent years as the use of these items has increased. Credit cards are lost, stolen or forged, and often substantial purchases are made on the card by someone other than the proper bearer before it becomes possible to locate the fraudulent user of the card and before the improper use of the card is discovered by the owner and notice is given to the credit card company. In the case of a check, the merchant, clerk, waiter or bank teller is faced with the problem of making sure that the person tendering the check is either the one possessing the account upon which the check is drawn or is the person named as payee on the check. In the case of the teller of the bank originating the account, he at least can check the signature with the signature on the signature card if he has doubts. If the teller is not acquainted with that customer, this still does not take care of the possibility that the check was lost or stolen after being signed by the owner of the account. In other words, even the bank teller has no way of knowing that the person tendering the check is actually the person upon whose account the check is drawn. The problem with which merchants, clerks and waiters are faced is even more difficult. In some places, it is possible to check whether there is such an account and whether there is sufficient money in the account to cover the check. Agai, this does not take care of stolen checks. Even when the check is drawn on the establishment for the exact amount, the clerk may have no way of knowing that the person writing the check is the owner of the account.

For the reasons mentioned above, it is highly advantageous that there be some means by which a person to whom a check or credit card is tendered can readily identify whether the person tendering the card or check is the person whose name appears on the card or check. Furthermore, it is highly desirable that this means be one which does not require manipulation of the card or check and which can be done very quickly. It is also important that the identification means be one which is not readily understandable by a stranger. If the system is understandable by a stranger, it is always possible for a person who has stolen the card or check to alter the identification indicia so that they conform with his physical characteristics. Altering the identification indicia to conform with the physical characteristics of the bearer will be easily revealed upon examination of the instrument.

Numerous attempts have been made to develop means for identifying a person tendering the card or check. A typical arrangement of this type is shown in the Rand U.S. Pat. No. 1,813,257. This patent is for a charge card in which holes are punched through various portions of the card. The clerk to whom the card is tendered lays the card over another card and reads through the openings the various physical characteristics of the proper bearer of the card. The drawback to this arrangement is that the clerk must go through the obvious checking step of taking the card and placing it over another card which may or may not always be readily accessible.

Another approach to this problem is described in the Cavanaugh et al U.S. Pat. No. 3,048,697. In this patent, the picture of the proper bearer of the card, his weight, the color of his hair, the color of his eyes and his age are printed in invisible ink on the card. The card is then placed under a source of ultraviolet radiation and all of this information is available to the teller or salesperson. While this type of arrangement would satisfactorily identify the person, it presents a problem in that a source of ultraviolet radiation must be available at each location at which a card may be tendered. Furthermore, the step of placing the card under such a source of ultraviolet radiation is quite obvious and could be objected to by the person tendering the card if he or she is the proper bearer of the card.

A rather sophisticated system is shown in the Goldman et al U.S. Reissue Pat. No. Re. 30,579. In this patent, an arrangement is disclosed in which the various physical characteristics of the person tendering the card or check are punched in by the salesperson or teller along with various other information such as a driver's license number and so forth. This information is sent to a memory bank and the teller or salesperson receives back considerable information about the person and his credit record. While this system undoubtedly furnishes an excellent means of identifying an individual, it involves the use of very sophisticated equipment and again presents the drawback that the person tendering the card or check tends to be irritated at the delay and the procedure, if he or she is the correct person.

There are numerous other patents which deal with this general subject, among them are the Wittboldt U.S. Pat. No. 3,363,346, the Estrada U.S. Pat. No. 4,325,570, the McDonald U.S. Pat. No. 2,974,426, the Chittenden U.S. Pat. No. 47,798, and the Scudder U.S. Pat. No. 777,149. None of these patents, however, shows a simple system by which a person to which a document is tendered can quickly determine, without the use of auxiliary apparatus (other than a simple reference key list when necessary), whether the person tendering the document is one legitimately entitled to do so.

SUMMARY OF THE INVENTION

The present invention is concerned with a method of personal identification in which a system of indicia is placed on the document or instrument describing the apparent and distinct personal characteristics of the rightful owner of that instrument as well as accessories typically or necessarily carried, worn or used by such owner. Such accessories can include glasses, hearing aids, canes, crutches, walkers, wheelchairs, and the like, for example. The person to whom it is tendered is provided with an identification indicia reference key list relating specific indicia to certain characteristics, which key list can be readily memorized. Consequently, it can be quickly determined, by the merchant, clerk or other person to whom the instrument is tendered, whether the physical characteristics of the person tendering the document match those on the instrument.

The identifying indicia can be perforated, printed or written on a paper instrument such as a check, airline ticket or so forth. In the case of a credit card or similar instrument, it can be printed or depressed into the card. By depressing the identifying indicia into the card, alteration of the identifying indicia is made very difficult, if not impossible. Furthermore, where the card is a card used by imprinting the same on charge slips, the depressed indicia will not be printed. Thus, the personal identifying data will not appear on copies of the charge slips or on carbons used in imprinting the charge slips, thereby denying that information to others except at the time of presentation for payment.

The identification is accomplished by imprinting on the instrument to be tendered indicia or a series of letters, each of which identifies one of the physical characteristics of the rightful bearer of the instrument. These letters can identify such features as the sex, race, eye color and hair color, age, height, weight and the nature of any accessories such as glasses, hearing aids or walking aids. By relating these leters to the particular characteristics, it is possible to have a series of leters which concisely indicate a large number of characteristics and which can be readily correlated, by the person to whom the document is being tendered, with the correct physical characteristics of the proper bearer of the instrument.

In some cases, I find it desirable to employ not only letters but also numerals. The letters are used where there are only a limited number of variations possible, such as race, sex, color of eyes and so forth. The numerals are used where there is a greater variation in physical characteristics possible, such as height, age and weight.

Various other features of the invention and the manner in which it is carried out will be obvious from the accompanying description, claims and drawing.

BRIEF DESCRIPTION OF THE DRAWINGS

FIG. 1 is an illustration showing the relationship between various characteristics of the proper bearer of the instrument and the indicia to be placed on the instrument being tendered.

FIG. 2 is a drawing of a card bearing indicia in accordance with my invention indicating the various physical characteristics of the person to be identified, based upon the chart of FIG. 1.

FIG. 3 is a drawing of a chart similar to that of FIG. 1, but showing a modified system in which both letters and numerals are employed for identifying the characteristics of the proper bearer of the instrument.

FIG. 4 is a view of a card bearing indicia corresponding to the chart of FIG. 3.

FIG. 5 is a cross-sectional view taken along line 5—5 of FIG. 4.

FIG. 6 is a view of a check bearing identifying indicia, in accordance with the present invention.

FIG. 7 is a fragmentary view of a check bearing a modified arrangement for identifying the proper payee.

DETAILED DESCRIPTION OF THE PREFERRED EMBODIMENTS

Referring to FIG. 1, there is depicted a chart showing one form of relationship between the indicia to be applied to an instrument and the physical characteristics represented by such indicia. In the first column, there are listed various features to be identified. In the second column, there is an indication of the letter of the word identifying such characteristic as used in the identifying indicia. In the third column, labeled "Designation", there are the letters which depict the various characteristics. In the fourth column, headed "Description", there is a listing of the various physical characteristics to be identified. In the case of each word designating one of the characteristics, the letter of the word that is used in the identifying indicia is underlined.

Turning to the chart, it will be noted that in connection with the sex of the person, there are only two letters, F and M. F is the first letter of the word "female" and thus designates female, and M is the first letter of the word "male" and thus designates male.

In the second line, the race is indicated. Here, the first letter of each word is employed. Thus, B designates that the intended bearer is Black, C designates that the intended bearer is Caucasian, H designates that the bearer is Hispanic, I designates that the intended bearer is Indian, and O that he or she is Oriental.

Turning to the third line, the color of the eyes is indicated by the last letter of a word indicative of the color of the eyes. This is necessary to use last letters because the first letters would be the same for several different colors. Thus E, which is the last letter of "blue", designates that the eyes of the intended bearer are blue. K, which is the last letter of "black", designates that the eyes of the intended bearer are black. L, which is the last letter of "hazel", designates that the color of the eyes of the intended bearer is hazel. Similarly, N designates that the eyes of the intended bearer are brown.

Turning to the fourth line, the hair is also indicated by the letter corresponding to the last letter of the appropriate color. Thus, blond hair is indicated by the letter D, white hair by the letter E, black hair by the letter K, brown hair by the letter N, and gray hair by the letter Y.

In the fifth line, the means for identifying the age is shown. Thus, Y designates yound, M designates mature, and S designates senior. In this case, as with sex and race, the first letter of each significant word is employed.

Again, with height, shown in the sixth line, the first letter of each significant word is employed. Thus, S designates short, M the word medium, and T the word tall.

In the seventh line, the letters L, M and H are employed to designate the weight. Thus, a light person is indicated by the letter L, a person of moderate weight is indicated by the letter M and a person of heavy weight is indicated by the letter H.

The eighth line indicates what accessory, if any, a person is carrying. Thus, the letter G indicates the word "glasses", H the word "hearing", W the word "walking", and U the word "unapplicable". The word "walking" refers to walking aids such as a walking cane, crutch or wheel chair. The letter U will normally mean that the person does not use such accessories. The letter U may also be used in connection with any of the above lines when the person prefers that the specific descriptive information, such as race, not be included.

Referring now to the chart, it is obvious that if the bearer is a male Caucasian, having brown eyes and gray hair who is young, short, of moderate weight and wearing glasses, the identifying letters will be M, C, N, Y, Y, S, M and G.

It is to be understood that the material on the chart will be printed on a card that can be positioned at a place accessible to the person to whom the document is tendered. This card can thus act as an identifying key to the identifying indicia.

Referring now to FIG. 2, the numeral 20 indicates a credit card for which the necessary identifying information has been applied. Referring to this card, the card contains the conventional account number 21 and expiration date 22. The name 23 of the intended bearer is given as Adam N. Eve. Following the name 23 are the letters MCNYSTMU, designated by the numeral 24. Referring now to the chart, the letter M designates that the intended bearer is male, the letter C that he is Caucasian, the letter N that he has brown eyes, the letter Y that the hair of the intended bearer is gray, and the letter S that the person is a senior. Going further in the analysis of the letters appearing on the charge card, the letter T indicates the bearer is tall, the letter M that he is of moderate weight, and the letter U that he does not wear glasses, has no hearing aid, and does not use a walking aid.

The matter of identification of the person tendering the card is a matter of degree. A clerk with very little memory of the specific identifying indicia will recognize that the letters F and M refer to whether the intended bearer is male or female, and that the letters B, C, H, I and O refer to whether he or she is Black, Caucasian, Hispanic, Indian or Oriental. This much alone can determine in a very large number of cases whether the actual bearer is the intended bearer. Up to this point, very little memory is required. It is not hard to remember that F designates female and M male. It is also not hard to remember that the B stands for Black, C for Caucasian, H for Hispanic, I for Indian and O for Oriental. Going a step farther, it is not too difficult for the clerk or other person to whom the document is tendered to remember that E stands for blue eyes, K for black eyes, L for hazel, and N for brown. If the person tendering the instrument obviously does not have these characteristics, then the clerk is automatically alerted to the fact that the person tendering the instrument is not the person who is the proper owner of the instrument. If the characteristics of the individual tendering the instrument correspond with those indicated by the first two letters, the person to whom the document is tendered can then proceed to the next letter. For example, in the illustration in FIG. 2, if the bearer has brown eyes, then the clerk or other person to whom the document is tendered, knows that the person is correct, so far. The person to whom the document is tendered can then go on to the next letter. Thus, if the person has any hair color other than gray hair, the person to whom the document is tendered will be altered to the fact that the bearer is not the intended bearer. If, however, the person has gray hair, he can then go on to the next letter. The letter S indicates that the person is a senior, and if the person is relatively young, then the clerk realizes that the card or other instrument is not being tendered by the correct person.

As each letter is compared with the features of the person tendering the document, the person to whom the document is tendered can go on to the next letter. By the time all eight characteristics have been properly identified, it is fairly certain that the person tendering the document is the correct person.

There are several aspects of my method of identification which should be noted. As pointed out previously, it is normally not necessary to go through all eight letters. Usually two or three are adequate to indicate that an incorrect person is tendering the document. Another feature which should be noted is that the letters are relatively meaningless unless someone knows the identifying indicia. Thus, a person picking up a card and seeing the letters MCNYSTMU has no realization of what these letters actually mean. A person who has picked up, found or stolen a card or other instrument thus is not alerted to the fact that the instrument bears indicia indicating that the person possessing the document is not the intended possessor of the document. A third feature is that the various letters are arranged in accordance with the usual sequence of observation of the characteristics of a person.

In carrying out the method of the invention in forming the complete identification indicia, the proper feature or characteristic of an individual is chosen according to the usual sequence of visual impression of the characteristics of a person. The proper descriptive word is then determined after which the correct key letter according to placement in that descriptive word is then designated. Upon the completion of the identifying indicia relating to the total list of features, the result is the personal identification of the owner and/or intended bearer of an instrument, on that instrument.

The first category of sex is determined and then designated by the first letter of the gender. The second category of race is determined and then designated by the first letter of the word describing that race. The third and then fourth categories of eye color and hair color are determined and then designated by the last letter of the word descriptive of that color. This necessity of deviation from the use of the first letter of the descriptive word, as is generally the case herein, is caused by what would result in repetition in a category in colors such as blue, black and brown, and therefore the inability to differentiate.

In the fifth category of age, it is necessary to take socially accepted brackets of approximation of years, then using the first letter of the descriptive adjective of that age bracket, to designate such terms as young representing to 35 years, mature representing 35 to 65 years and senior as over 65 years. In the sixth category of height, the first letter of the descriptive word is then used, such as short, medium and tall, to designate the more or less obvious, keeping in mind the actual feet and inches. In the seventh category of weight, wherein the first letter of the adjective of the descriptive word is then used, such as light, moderate and heavy, the proportion of the individual in relation to height should also be considered. It will be noted that the terminology employed is selected so as not to be objectionable, such as using the word "heavy" instead of "fat." In reference to the eighth and final category of assistance aids under the term of accessories, the first letter of the most apparent noun word associated with that physical functioning is employed, such as glasses for sight, hearing for hearing aid and walking for the different types of aids for human locomotion.

It should also be noted that within the method of the invention there is created a system of natural thought sequence and memory process for easy recall when the occasion arises. This is accomplished by the key letter designation being drawn directly from, and its positioning in, the descriptive word of the feature as in the first four categories, its associated adjective in the fifth, sixth and seventh categories, and its associated word in the eighth and final category. The key letters in the first four categories are also placed in their alphabetical sequence.

This complete identifying indicia describing the features of the owner or correct bearer of a certain instrument or document can be arranged in a line either horizontally or vertically to accommodate placement on the instrument or document with the categories in the specific order as to the usual sequence of observation. They are then applied to the object by any suitable means such as depressing, embossing, perforating or printing.

An advantage of my method is that no auxiliary equipment other than a printed key to identification is necessary to determine whether the bearer of the card is the correct one or not. All that the recipient of the card has to do is to have memorized some rather obvious correlations between the letters and the particular physical characteristics. As pointed out above, it takes hardly any memory at all to realize that F stands for female and M stands for male. Similarly, it is very easy to remember that B stands for Black, C for Caucasian, H for Hispanic, I for Indian, and O for Oriental. Normally, the key information can be readily memorized and the examination of the person and the correlation with the information on the card can be done with a minimum of embarrassment.

MODIFICATION OF FIGS. 3 AND 4

The modification of FIGS. 3 and 4 differs from that of FIGS. 1 and 2 primarily in that instead of using merely letters, numerals are employed to indicate certain characteristics which have a wide variety of possibilities. Thus, the age is indicated by numerals which correspond to the actual age. The height in inches is indicated by numerals. The first two figures of weight are also indicated by numerals. Thus, referring specifically to FIG. 3, the age is shown as indicated by the numerals 25, 33, 40, 48, 55, 63 and so forth. The height may be indicated by the numerals 64, 74, 76 and so forth. It is to be understood that these are typical actual ages. In this case, 64 indicates 64 inches, 74 indicates 74 inches, 76 indicates 76 inches and so forth. The weight is indicated by the first two figures of the actual weight. Thus, 132 pounds is indicated by the numeral 13, 170 pounds by the numeral 17 and so forth. It is thus possible to rather accurately indicate age, height and weight. While I have shown the numerals as indicating actual age, the numerals can instead indicate the last two digits of the year of birth of the individual.

Referring to FIG. 4, which shows a charge card 30 with the identifying information 34 based upon the chart of FIG. 3. The account number is indicated by the numeral 31, the expiration data by the numeral 32, and the name of the correct bearer of the card by numeral 33. It will be noted that the person is identified by the indicia MCND256515U. This means that the person is male, of the Caucasian race, with brown eyes, blond hair, 25 years old, five feet five inches (65 inches) tall, of a weight approximately 150 pounds, and with no auxiliary accessories such as glasses, hearing aid or walking cane. Again, as with the modification of FIGS. 1 and 2, it is often not necessary to do any more than go beyond the first two or three letters. If, however, it is necessary to more accurately identify the person, it is possible with this system to very precisely indicate whether the person tendering the card is the intended bearer by completing the list of categories.

MODIFICATION OF FIGS. 4 AND 5

While the indicia in FIG. 4 can be applied to the card in a conventional manner either by imprinting or by a perforating process, I have shown, in FIGS. 4 and 5, a unique arrangement for applying this information. In the conventional credit card, the information pertaining to the individual, such as the credit card account number 31, the date of expiration 32 and the name 33 of the intended bearer of the card, is applied by embossing this information so that the numerals and letters project upwardly from the card. The card is then placed in an imprinting device along with copies of the charge slips which have sheets of carbon paper placed between the the charge slips so that the embossed information is imprinted through the carbon paper upon the underlying charge slips. This has the drawback that if the carbons used in imprinting the charge slips fall into the wrong hands, the information can be used to produce a forged charge card which can then in turn be used improperly to charge purchases against the account of the real owner of the card. In the modifications of FIGS. 4 and 5, I have shown the additional information 34 of the present invention as being impressed inwardly, as best shown in FIG. 5, so that when the card is placed into a conventional card imprinting machine, identifying information 34 will not be imprinted and the information appearing on the charge slips and the carbons will be only that necessary for effecting the charge. It will not reveal the physical characteristics of the person. Thus, if anyone falsely made a charge card from the carbons, the information of the present invention would not appear on the forged card as it could not have been picked up from the carbons.

With the arrangement of FIGS. 4 and 5, it is possible for the person to whom the card is tendered to ascertain whether the person tendering the card is the correct owner of the card. At the same time, if this has been determined, when the card is placed in the imprinting machine for imprinting the charge slips, the information identifying the proper bearer of the card will not appear on the carbons, as pointed out above. Thus, the identifying indicia is not reproduced and, if a forged card is produced from the carbons, the information identifying the individual will not appear on the card. If the employees of the establishment accepting such cards are properly instructed, those receiving the card will not accept the card unless the personal identification information of the present invention actually appears on the card.

Actually, with the arrangement of FIG. 2 where the identifying information is merely printed in a conventional manner on a charge card, the identifying information will not be imprinted and the information appearing on the charge slips and the carbons will be only that necessary for effecting a charge. In other words, there will only be the name, the expiration date and the account number, which are normally printed in embossed letters, that will be reproduced. The advantage, however, of the arrangement of FIGS. 4 and 5 is that by indenting the identifying information, it becomes much more difficult to alter than would be the case where the information is printed with flat printing, as in FIG. 2.

MODIFICATION OF FIG. 6

The system of the present invention can be employed in a variety of ways. For example, the letters based upon the chart of FIG. 1 can be imprinted onto a check after the name of the payee. These letters will correspond with the intended payee. In the case of a company payroll, the records may be set up so that this information is imprinted along with the name of the payee. In the example shown in FIG. 6, a check is indicated by the numeral 40, the payee's name by the numeral 43 and the identifying information by the numeral 44. The identifying information 44 appearing after the name of the payee consists of the letters MCNYSTHG. This means that the person for whom the check is intended is a male Caucasian, with brown eyes and gray hair, a senior in age, tall, heavy in weight and wearing glasses. Anyone tendering the check who does not fit this description will be immediately recognized as having obtained the check improperly.

MODIFICATION OF FIG. 7

The arrangement of FIG. 7 shows a further modification. In this case, only a portion of a check 50 is shown. In this case, the various letters corresponding to those of the chart are arranged in vertical rows to provide identifying information designated by the reference numeral 54. Thus, the first vertical row designates whether the person is female or male, the second row designates the race of the person, the third vertical row the color of the eyes, the fourth vertical row the color of the hair, the fifth vertical row the age category, the sixth vertical row the height, the seventh vertical row the weight, and the eighth vertical row the situation with regard to accessories. What the person preparing the check does is to encircle the characteristics of the person to whom the check is intended to be paid. In the drawing, the letter M in the first vertical row is encircled, and in the following rows the letters C, N, Y, S, T, H and G are encircled. This corresponds to the same identifying information as in FIG. 6. In other words, it identifies a person corresponding to the letters M, C, N, Y, S, T, H and G. The significance of these letters has already been explained in connection with FIG. 6. The arrangement of this modification, of course, works only where the characteristics of the intended payee are known.

CONCLUSION

It will be seen that I have provided a method of identification which makes it possible to readily determine whether the person tendering an instrument is the person who is the correct owner of it. The only necessary equipment is a printed key to the identification indicia for reference when and if necessary. The system employed for interpreting the identifying indicia on the instrument relies upon relatively little memorization, particularly if not all of the characteristics are to be compared. Where, as in the modification of FIGS. 4 and 5, the information is embedded into a card rather than being embossed thereon, the information is not reproduced when the card is placed in a credit slip imprinting machine. Thus, any card improperly made from the information upon the carbons will not bear the identifying information and will alert the person to whom the card is tendered to the fact that the card is not a proper card.

While I have shown certain modifications of the invention for purposes of illustration, it is to be understood that the scope of the invention is limited to that of the appended claims.

I claim:

1. A method of verifying the identity of an authorized person in possession of a valuable document without necessarily alerting such person to the happening of such verification procedure, the method including the steps of:
    (a) developing a coding system whereby observable personal characteristics of persons and descriptions of accessories worn, used or carried by such persons can each be reduced to a readable form which will be unintelligible to persons not having access to the coding system;
    (b) obtaining, as a result of visual observation, information about a person who is to be authorized to process a valuable document, such information relating to observable characteristics of such person and to accessories worn, used or carried by the person;
    (c) using the coding system, encoding such obtained information in such readable, nominally unintelligible form and entering said encoded information onto the valuable document before giving possession of the document to such authorized person;
    (d) providing access to the coding system to all individuals who may have occasion to verify as to whether the person in possession of such encoded valuable document is the authorized person;
    (e) scrutinizing each person presenting the valuable document to one of such individuals and comparing that person's observed characteristics and accessories with the personal characteristics and described accessories as indicated in coded form on the document; and
    (f) challenging any person possessing the document who cannot be verified as being the authorized person.

2. Apparatus for verifying the identity of an authorized person in possession of a valuable document without the alleged authorized person necessarily becoming aware of the verification procedure being performed, said apparatus including:
    (a) an encoding and a decoding schedule assigning readable but nominally unintelligible codes to observable personal characteristics and to descriptions of accessories carried, used or worn by persons to be authorized, said schedule being available to individuals responsible for designating authorized persons;
    (b) a valuable document onto which coded readable but nominally unintelligible codes related to the authorized person can be entered before that person is given possession of the valuable document.

* * * * *